US010893050B2

United States Patent
Cayton et al.

(10) Patent No.: US 10,893,050 B2
(45) Date of Patent: *Jan. 12, 2021

(54) COMPUTER PRODUCT, METHOD, AND SYSTEM TO DYNAMICALLY PROVIDE DISCOVERY SERVICES FOR HOST NODES OF TARGET SYSTEMS AND STORAGE RESOURCES IN A NETWORK

(71) Applicant: INTEL CORPORATION, Santa Clara, CA (US)

(72) Inventors: Phil C. Cayton, Warren, OR (US); James P. Freyensee, Hillsboro, OR (US); Jay E. Sternberg, North Plains, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,099

(22) Filed: Jan. 9, 2019

(65) Prior Publication Data

US 2019/0238545 A1 Aug. 1, 2019

Related U.S. Application Data

(63) Continuation of application No. 15/246,361, filed on Aug. 24, 2016, now Pat. No. 10,200,376.

(51) Int. Cl.
*H04L 29/06* (2006.01)
*G06F 16/9535* (2019.01)
*H04L 29/08* (2006.01)

(52) U.S. Cl.
CPC ........ *H04L 63/101* (2013.01); *G06F 16/9535* (2019.01); *H04L 67/16* (2013.01)

(58) Field of Classification Search
CPC .. H04L 63/101; H04L 67/16; G06F 17/30867
See application file for complete search history.

(56) References Cited

U.S. PATENT DOCUMENTS

| 5,396,637 A | 3/1995 | Harwell et al. |
| 5,603,038 A | 2/1997 | Crump et al. |

(Continued)

FOREIGN PATENT DOCUMENTS

| KR | 20140142530 A | 12/2014 |
| TW | I225589 B | 12/2004 |

(Continued)

OTHER PUBLICATIONS

Christie, M., et al., "Red Hat Enterprise Linux 5 Online Storage Reconfiguration Guide", For Red Flat Enterprise Linux 5, Edition 1,© 2008, 43 pp.

(Continued)

*Primary Examiner* — Meng Li
(74) *Attorney, Agent, or Firm* — Compass IP Law PC

(57) ABSTRACT

Provided are a computer product, method, and system to dynamically provide discovery services for host nodes of target systems and storage resources in a network. Discover on storage resources available at target systems. An access control list indicates subsets of the host nodes that can access the storage resources at the target systems. A query is received from a requesting host node comprising one of the host nodes for storage resources the host node is permitted to access according to the access control list. Host discovery information is returned to the requesting host node indicating the storage resources the requesting host node is provisioned to access, wherein the requesting host node establishes a connection with the target systems indicated in the returned host discovery information to access the storage (Continued)

resources the requesting host node is provisioned to access indicated in the access control list.

27 Claims, 8 Drawing Sheets

(56) References Cited

U.S. PATENT DOCUMENTS

| | | | |
|---|---|---|---|
| 5,809,526 | A | 9/1998 | Patel |
| 5,860,083 | A | 1/1999 | Sukegawa |
| 5,978,924 | A | 11/1999 | Ahn |
| 6,393,518 | B2 | 8/2002 | Koivuniemi |
| 6,523,102 | B1 | 2/2003 | Dye et al. |
| 6,535,996 | B1 | 3/2003 | Brewer et al. |
| 6,968,424 | B1 | 11/2005 | Danilak |
| 7,146,455 | B2 | 12/2006 | Cheng |
| 7,260,695 | B2 | 8/2007 | Batchelor et al. |
| 7,437,597 | B1 | 10/2008 | Kruckemyer et al. |
| 7,653,699 | B1 | 1/2010 | Colgrove et al. |
| 7,716,525 | B1 | 5/2010 | Buchko et al. |
| 7,802,145 | B1 | 9/2010 | Bainbridge et al. |
| 7,954,006 | B1 | 5/2011 | Mangipudi |
| 8,069,309 | B1 | 11/2011 | Long |
| 8,325,554 | B2 | 12/2012 | Sweere et al. |
| 8,510,598 | B2 | 8/2013 | Vedder et al. |
| 8,612,676 | B2 | 12/2013 | Dahlen et al. |
| 8,966,164 | B1 | 2/2015 | Asnaashari et al. |
| 10,013,168 | B2 | 7/2018 | Cayton et al. |
| 10,176,116 | B2 | 1/2019 | Sternberg et al. |
| 10,200,376 | B2 | 2/2019 | Cayton et al. |
| 10,275,160 | B2 | 4/2019 | Freyensee et al. |
| 2002/0095602 | A1* | 7/2002 | Pherson ............... H04L 63/101 726/1 |
| 2003/0191734 | A1 | 10/2003 | Voigt |
| 2006/0015683 | A1 | 1/2006 | Ashmore et al. |
| 2006/0126833 | A1 | 6/2006 | O'Leary et al. |
| 2006/0138231 | A1 | 6/2006 | Elberbaum |
| 2006/0274566 | A1 | 12/2006 | Takashima et al. |
| 2007/0124604 | A1 | 5/2007 | Feldstein et al. |
| 2007/0229521 | A1 | 10/2007 | Li et al. |
| 2007/0294543 | A1 | 12/2007 | Chiang |
| 2009/0172372 | A1 | 7/2009 | Kumar et al. |
| 2009/0182962 | A1 | 7/2009 | Khmelnitsky et al. |
| 2009/0254705 | A1 | 10/2009 | Abali et al. |
| 2009/0271563 | A1 | 10/2009 | Gopalan et al. |
| 2009/0313416 | A1 | 12/2009 | Nation |
| 2010/0011155 | A1 | 1/2010 | Kitagawa |
| 2010/0011261 | A1 | 1/2010 | Cagno et al. |
| 2010/0080057 | A1 | 4/2010 | Reuter et al. |
| 2010/0095053 | A1 | 4/2010 | Bruce et al. |
| 2010/0114889 | A1 | 5/2010 | Rabii et al. |
| 2010/0198972 | A1 | 8/2010 | Umbehocker |
| 2010/0202240 | A1 | 8/2010 | Moshayedi et al. |
| 2011/0161748 | A1 | 6/2011 | Casper et al. |
| 2011/0231594 | A1 | 9/2011 | Sugimoto et al. |
| 2011/0321123 | A1 | 12/2011 | Ishikawa |
| 2012/0047314 | A1 | 2/2012 | Chen et al. |
| 2012/0096332 | A1 | 4/2012 | Furno et al. |
| 2012/0166891 | A1 | 6/2012 | Dahlen et al. |
| 2012/0198136 | A1 | 8/2012 | Moshayedi et al. |
| 2012/0271990 | A1 | 10/2012 | Chen et al. |
| 2013/0019048 | A1 | 1/2013 | Bland et al. |
| 2013/0019076 | A1 | 1/2013 | Amidi et al. |
| 2014/0068200 | A1 | 3/2014 | Schnapp et al. |
| 2014/0189203 | A1 | 7/2014 | Suzuki et al. |
| 2014/0201562 | A1 | 7/2014 | Breakstone et al. |
| 2014/0281040 | A1 | 9/2014 | Liu |
| 2014/0304461 | A1 | 10/2014 | Kitahara et al. |
| 2015/0089287 | A1 | 3/2015 | Jayakumar et al. |
| 2015/0095554 | A1 | 4/2015 | Asnaashari et al. |
| 2015/0134880 | A1 | 5/2015 | Danilak et al. |
| 2015/0143134 | A1 | 5/2015 | Hashimoto |
| 2015/0212734 | A1 | 7/2015 | Asnaashari et al. |
| 2015/0319237 | A1 | 11/2015 | Hussain et al. |
| 2015/0319243 | A1* | 11/2015 | Hussain ............... G06F 3/065 709/217 |
| 2016/0085718 | A1 | 3/2016 | Huang et al. |
| 2016/0188414 | A1 | 6/2016 | Jayakumar et al. |
| 2017/0123656 | A1 | 5/2017 | Benisty et al. |
| 2017/0177216 | A1 | 6/2017 | Freyensee et al. |
| 2017/0185310 | A1 | 6/2017 | Cayton et al. |
| 2017/0344259 | A1 | 11/2017 | Freyensee et al. |
| 2018/0004559 | A1 | 1/2018 | Geml et al. |
| 2018/0088978 | A1 | 3/2018 | Li et al. |
| 2018/0188974 | A1 | 7/2018 | Cayton et al. |
| 2018/0260148 | A1 | 9/2018 | Klein |
| 2019/0238545 | A1 | 8/2019 | Cayton et al. |
| 2019/0243777 | A1 | 8/2019 | Sternberg et al. |
| 2019/0303003 | A1 | 10/2019 | Freyensee et al. |

FOREIGN PATENT DOCUMENTS

| | | |
|---|---|---|
| TW | 201118546 A | 6/2011 |
| WO | 03060716 A1 | 7/2003 |
| WO | 2006039711 A1 | 4/2006 |
| WO | 2015041698 A1 | 3/2015 |
| WO | 2015080690 A1 | 6/2015 |
| WO | 2016105814 A1 | 6/2016 |
| WO | 2017112021 A1 | 6/2017 |
| WO | 2017112285 A1 | 6/2017 |
| WO | 2018038840 A2 | 3/2018 |

OTHER PUBLICATIONS

First Office Action for U.S. Appl. No. 15/246,361, dated May 2, 2018, 13 pages.

International Search Report and Written Opinion for International Application No. PCT/US2017/043568, dated Oct. 20, 2017, 15 pp.

Marks, K., "An NVM Express Tutorial", Flash Memory Summit 2013, 92 pp.

Mintum, D., "NVM Express Over Fabrics", Mar. 15-18, 2015, NVM Express, Total 13 pp.

Notice of Allowance for U.S. Appl. No. 15/279,318, dated Aug. 29, 2018, 16 pp.

NVM Express, Inc., "NVM Express Over Fabrics", Revision 1.0, Jun. 5, 2106,© 2007-2016, Total 49 pp.

NVM Express, Inc., "NVM Express", Revision 1.2a, Oct. 23, 2015,© 2007-2015, Total 209 pp.

Office Action 1 for U.S. Appl. No. 15/279,318, dated Feb. 22, 2018, 13 pp.

Onufryk, P., "What's New in NVMe 1.1 and Future Directions", NVM Express, Flash Memory Summit 2013, Santa Clara, CA, Total 26 pp.

Response to Office Action 1 for U.S. Appl. No. 15/279,318, dated May 22, 2018, 14 pp.

Sardella, S., "NVMe Over Fabrics Agenda", Aug. 11, 2015, NVM Express, Total 14 pp.

U.S. Appl. No. 14/976,949, filed Dec. 21, 2015, entitled "Method and Apparatus to Enable Individual NVMe 10 Queues on Differing Network Addresses of an NVMe Controller", invented by Freyensee, J.P. et al.

U.S. Appl. No. 14/998,061, filed Dec. 24, 2015, entitled "Method and Apparatus for Disaggregating NVME Storage Controller Stack", invented by Clayton, P.C. et al.

U.S. Appl. No. 15/167,908, filed May 27, 2016, entitled "A Computer Product, Method, and System to Dynamically Manage Storage Devices Accessed Remotely Over a Network", Invented by Freyensee, J.P. et al.

U.S. Appl. No. 15/279,318, filed Sep. 28, 2016, entitled "A Computer Product, Method, and System to Provide a Virtual Target to Virtualize Target System Storage Resources as Virtual Target Storage Resources", Invented by J.E. Sternberg et al., 56 pp.

Wikipedia, "Internet Storage Name Service", [online], last modified on Aug. 12, 2016, [Retrieved on Sep. 18, 2016], retrieved from the Internet at , 2 pp.

"Intel Xeon Processor C550/C3500 Series-based Platform for Storage Applications" 2010, 6 pages, Intel Corporation, USA.

(56) References Cited

OTHER PUBLICATIONS

"NVM Express" retrieved from http://www.nvmexpress.org on Nov. 8, 2015, 2 pages.
"PCI Express Base Specification", Specification, Nov. 10, 2010, 860 pages, Revision 3.0, PCI-SIG, Beaverton, OR.
International Search Report and Written Opinion for International Application No. PCT/US2017/029982, dated Jul. 28, 2017, 14 pages. (77.346PCT (ISR & WO).
International Search Report and Written Opinion received for International Application No. PCT/US2011/061466, dated Jul. 31, 2012, 9 pages.
International Search Report and Written Opinion received for International Application No. PCT/US2013/061188, dated Jun. 20, 2014, 10 pages.
International Search Report and Written Opinion received for International Application No. PCT/US2015/062555, dated Mar. 15, 2016, 9 pages.
International Search Report and Written Opinion received for International Application No. PCT/US2016/055226, dated Jan. 19, 2017, 13 pages.
International Search Report and Written Opinion received for International Application No. PCT/US2016/063551, dated Mar. 13, 2017, 11 pages.

* cited by examiner

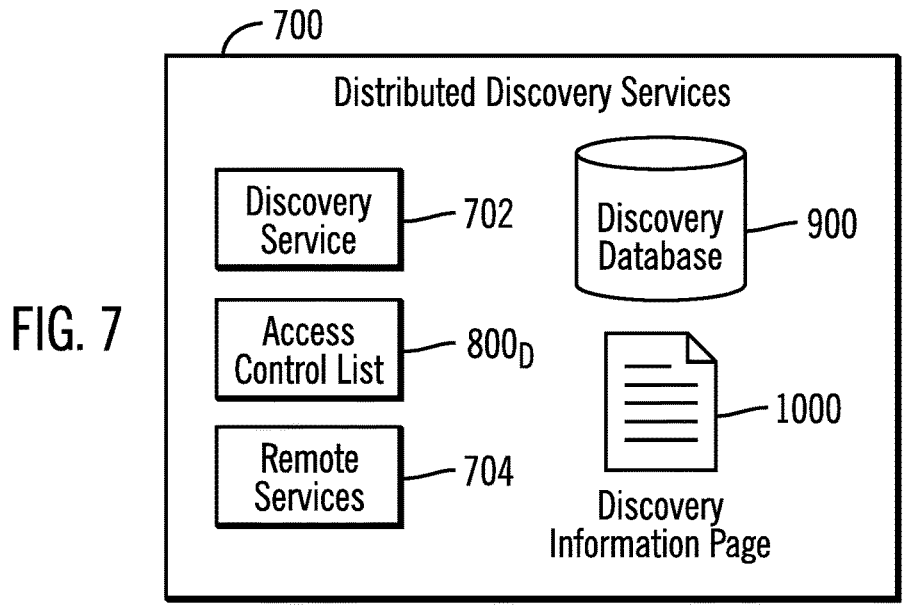
FIG. 7
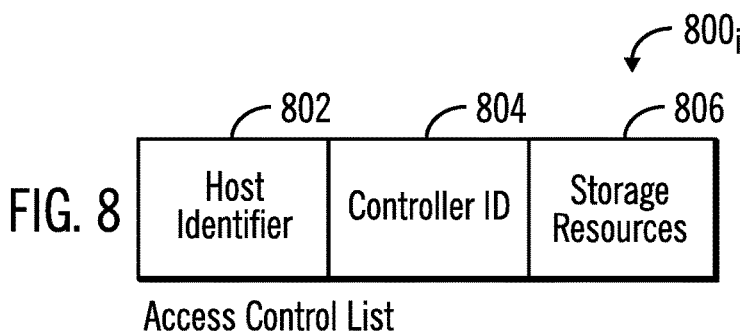
FIG. 8  Access Control List
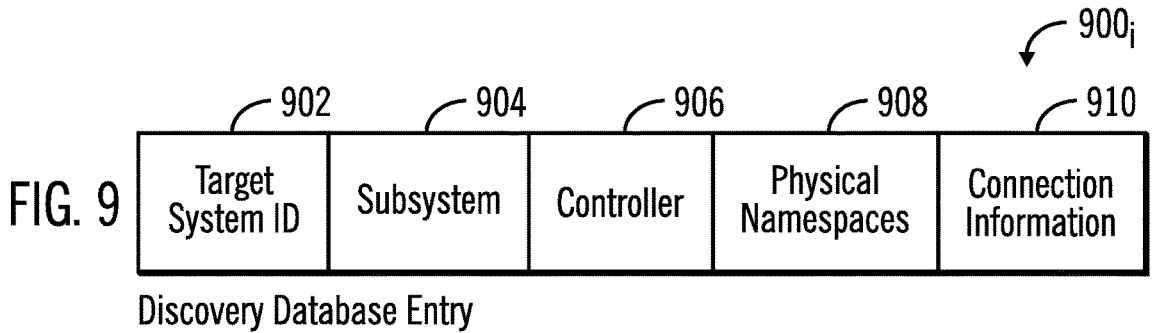
FIG. 9  Discovery Database Entry
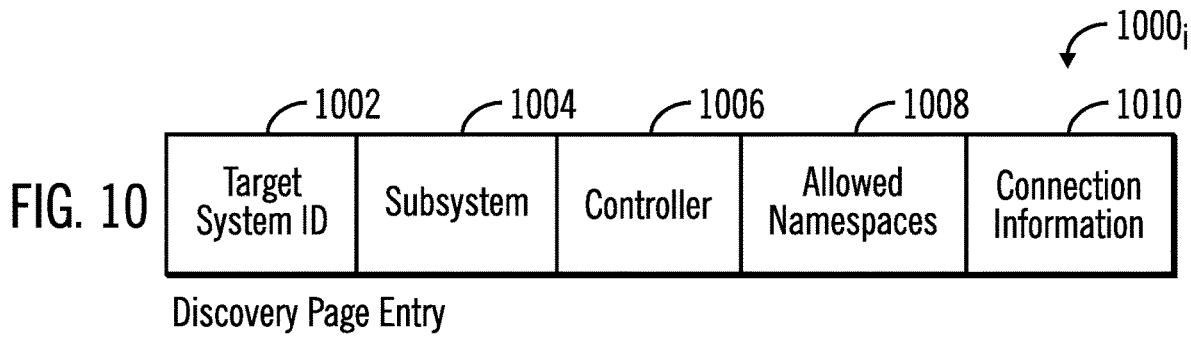
FIG. 10  Discovery Page Entry

COMPUTER PRODUCT, METHOD, AND SYSTEM TO DYNAMICALLY PROVIDE DISCOVERY SERVICES FOR HOST NODES OF TARGET SYSTEMS AND STORAGE RESOURCES IN A NETWORK

TECHNICAL FIELD

Embodiments described herein generally relate to a computer product, method, and system to dynamically provide discovery services for host nodes of target systems and storage resources in a network.

BACKGROUND

Non-Volatile Memory Express (NVMe) is a logical device interface (http://www.nvmexpress.org) for accessing non-volatile storage media attached via a Peripheral Component Interconnect Express (PCIe) bus (http://www.pcsig.com). The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices. A computer system may communicate read/write requests over a network to a target system managing access to multiple attached storage devices, such as SSDs. The computer system sending the NVMe request may wrap the NVMe read/write request in a network or bus protocol network packet, e.g., Peripheral Component Interconnect Express (PCIe), Remote Direct Memory Access (RDMA), Fibre Channel, etc., and transmit the network packet to a target system, which extracts the NVMe request from the network packet to process.

In NVMe environments, host nodes discover target systems having storage resources and then connect directly with the target systems to obtain connection information and connect to the target systems.

BRIEF DESCRIPTION OF THE DRAWINGS

Embodiments are described by way of example, with reference to the accompanying drawings, which are not drawn to scale, in which like reference numerals refer to similar elements.

FIG. 7 illustrates an embodiment of distributed discovery services.

FIG. 8 illustrates an embodiment of an access control list entry.

FIG. 9 illustrates an embodiment of a discovery database entry.

FIG. 10 illustrates an embodiment of a discovery page entry.

DESCRIPTION OF EMBODIMENTS

A target system includes an NVMe subsystem with one or more controllers to manage read/write requests to namespace identifiers (NSID) defining ranges of addresses in the connected storage devices. The hosts may communicate to the NVMe subsystem over a fabric or network or a PCIe bus and port. Each network or PCIe port may connect to one NVMe subsystem, and the NVMe subsystem may communicate with the attached storage devices using a PCIe bus.

Described embodiments provide a distributed discovery service on one or more separate systems or subsystems in a network that can discover information on target systems, including their subsystems, controllers and storage resources, e.g., namespaces, and deploy an access control list to provide hosts in the network with information on the storage resources they are provisioned to use. The distributed discovery service may further provide the hosts the connection information needed to connect to the target systems offering the storage resources provisioned to the hosts. In this way, with described embodiments, the host nodes obtain information on the target systems, subsystems, controllers and storage namespaces they may access from the distributed discovery service, and then the host nodes can directly connect with the target systems to access the resources.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
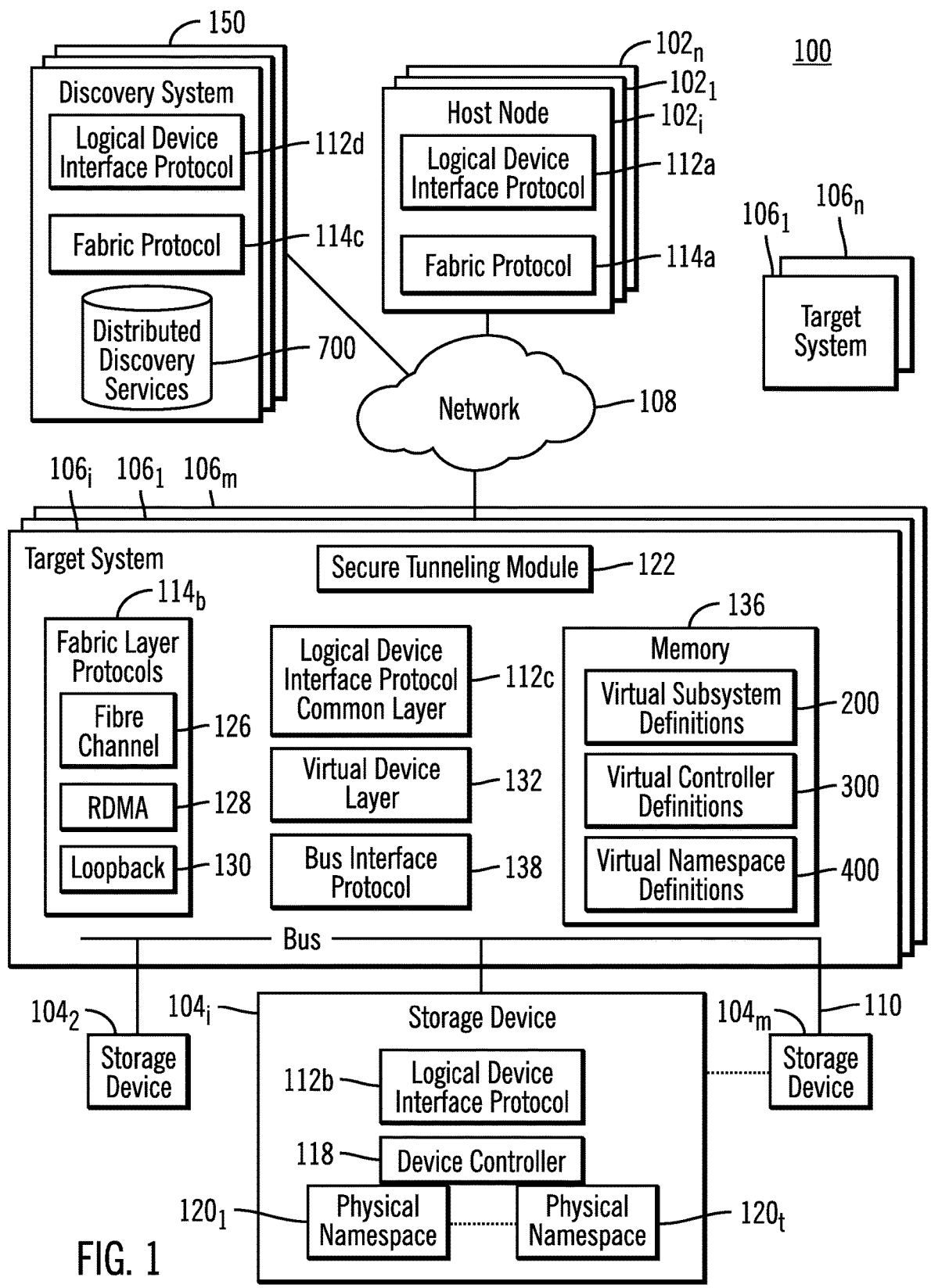
FIG. 1 illustrates an embodiment of a storage environment

FIG. 1 illustrates an embodiment of a storage environment 100 having a plurality of host nodes $102_1 \ldots 102_n$ that communicate with multiple storage devices $104_1 \ldots 104_m$ via target systems $106_1 \ldots 106_m$. The host nodes $102_1 \ldots 102_n$ may communicate with the target systems $106_1 \ldots 106_m$ over a network 108, such as a Fabric, and a target system, as shown with respect to target system $106_i$, communicates with the storage devices $104_1 \ldots 104_m$ over a bus interface 110. Each of the host nodes $102_1 \ldots 102_n$, includes, as shown with respect to host node $102_i$, a logical device interface protocol 112a to perform read/write operations with respect to the storage devices $104_1 \ldots 104_m$ and a fabric protocol 114a to communicate over the network 108. Each of the storage devices $104_1 \ldots 104_m$ may include, as shown with respect to storage device $104_i$, a logical device interface protocol 112b, the same as the logical device interface protocol 112a, a device controller 118 to perform storage device $104_i$ operations, and one or more physical namespaces $120_1 \ldots 120_t$. A physical namespace comprises a quantity of non-volatile memory that may be formatted into logical blocks. When formatted, a namespace of size n is a collection of logical blocks with logical block addresses from 0 to (n−1). The namespaces may further be divided into partitions or ranges of addresses. The physical namespaces $120_1 \ldots 120_t$ are identified by a namespace identifier (NSID) used by the device controller 118 to provide access to the namespace $120_1 \ldots 120_t$.

The target system $106_i$ may include a secure tunneling mode module 122 for secure communications from the host nodes $102_1 \ldots 102_n$ and one or more fabric layer protocols 114b, compatible with the fabric protocol 114a used by the host nodes $102_1 \ldots 102_n$ and the fabric controller 114c used by the discovery controller 150. The target system 106 may support multiple fabric layer protocols, such as Fibre Channel 126, Remote Direct Memory Access (RDMA) 128, loopback interface 130, etc. The target system 106 includes an instance of the logical device interface protocol common layer 112c to process the logical device interface protocol communications communicated from the host nodes $102_1 \ldots 102_n$. The virtual device layer 132 generates and manages virtualization definitions in a target system memory 136 that provide representations of target hardware and physical namespaces to the host nodes $102_1 \ldots 102n$, including virtual subsystem definitions 200, virtual controller definitions 300, and virtualization namespace definitions 400. The target system 106 further includes a bus interface protocol 138 to transmit logical device interface protocol read/write requests to the storage devices $104_1 \ldots 104_m$.

A discovery system 150 includes distributed discovery services 700 to enable host nodes $102_1 \ldots 102_n$ to discover and connect to target system $106_1 \ldots 106_m$ in the network 108. The discovery system 150 includes a logical device interface protocol 112d and fabric protocol 114c for network communication. There may be multiple discovery systems 150 deployed in the network 108 for the host nodes $102_1 \ldots 102_n$ to access.

In one embodiment, the logical device interface protocol 112a, 112b, 112c, 112d may comprise the Non-Volatile Memory Express (NVMe) protocol and the bus 110 and bus interface protocol 138 may comprise a Peripheral Component Interconnect Express (PCIe) bus. With described embodiments, a same NVMe read/write request may be transmitted from the host nodes $102_1 \ldots 102_n$ to the storage devices $104_1 \ldots 104_m$ without the need for conversion from one protocol to another. This use of the same logical device protocol request, e.g., NVMe, reduces latency in transmissions between the host nodes $102_1 \ldots 102_n$ and storage devices $104_1 \ldots 104_m$.

The address space of each of the namespaces in the storage devices $104_1 \ldots 104_m$ may be divided into one or more namespaces partitions, where each partition comprises a subset of addresses in a physical namespace $120_1 \ldots 120_t$. The host nodes $102_1 \ldots 102_n$ may further comprise any type of compute node capable of accessing storage partitions and performing compute operations.

The program components of the target system, such as 122, 114b, 132, 138 may be implemented in a software program executed by a processor of the target system 106, firmware, a hardware device, or in application specific integrated circuit (ASIC) devices, or some combination thereof.

The storage devices $104_1, 104_2 \ldots 104_m$ may comprise electrically erasable and non-volatile memory cells, such as flash storage devices, solid state drives, etc. For instance, the storage devices $104_1, 104_2 \ldots 104_m$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage devices $104_1, 104_2 \ldots 104_m$ may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage devices $104_1, 104_2 \ldots 104_m$ may also comprise a magnetic storage media, such as a hard disk drive etc.

The target system memory 136 may comprise a non-volatile or volatile memory type of device known in the art, such as a Flash Memory, a non-volatile dual in-line memory module (NVDIMM), Dynamic Random Access Memories (DRAMs), etc., or may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices, such as magnetic storage media, such as a hard disk drive etc. In certain embodiments, the target system memory 136 comprises a persistent, non-volatile storage of the virtual subsystem, virtual controller, and virtual namespace definitions to provide persistent storage over power cycle events.

Figure 2:
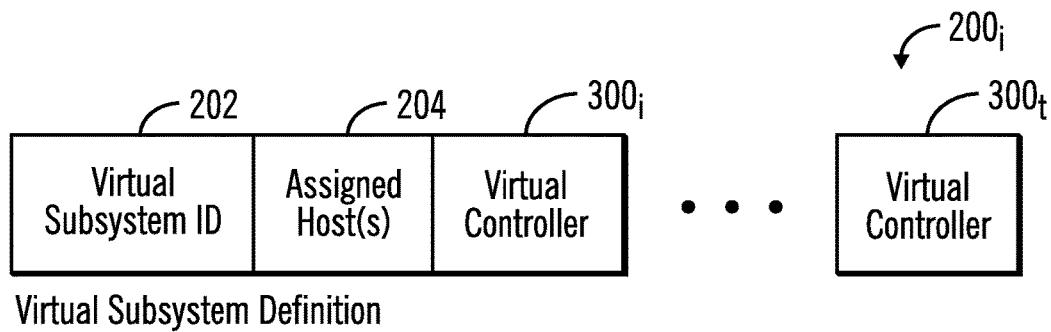
FIG. 2 illustrates an embodiment of a virtual subsystem definition to represent a subsystem to attached hosts.

FIG. 2 illustrates an embodiment of a virtual subsystem definition $200_i$ defining one of the virtual subsystems 200 configured in the target system 106, and includes: a virtual subsystem identifier (VSSID) 202; assigned hosts 204 comprising zero or more hosts assigned to use that virtual subsystem 202 to access the below storage devices $104_1 \ldots 104_m$; and one or more virtual controllers $300_1 \ldots 300_r$ configured in the virtual subsystem 202.

Figure 3:
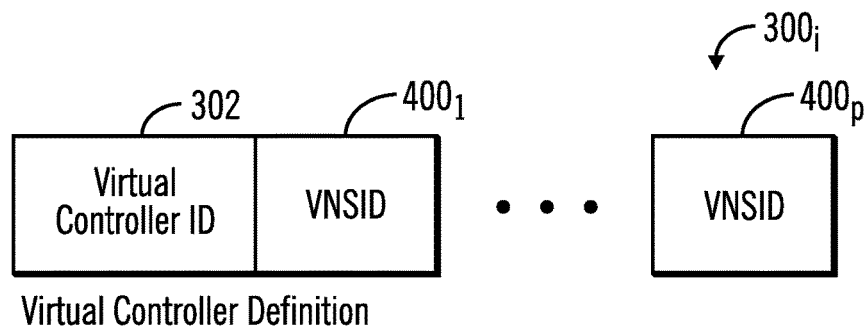
FIG. 3 illustrates an embodiment of a virtual controller definition within one of the virtual subsystems.

FIG. 3 illustrates an embodiment of a virtual controller definition $300_i$ to define one of the virtual controllers 300 configured in the target system 106, and includes: a virtual controller (VC) identifier 302 and one or more virtual namespaces $400_1 \ldots 400_p$, identified by a VNSID, assigned to that virtual controller 302. A virtual controller $300i$ may also have no assigned virtual namespaces.

Figure 4:
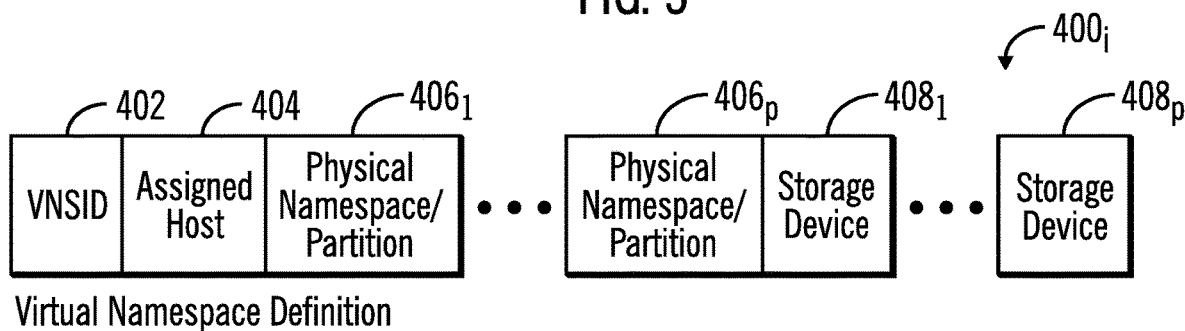
FIG. 4 illustrates a virtual namespace definition to define a virtual namespace that maps to a physical namespace/partition.

FIG. 4 illustrates an embodiment of a virtual namespace definition $400i$, and includes: a virtual namespace identifier (VNSID) 402; an assigned host 404 assigned to use the VNSID 402 to access a physical namespace; one or more assigned physical namespace/partitions $406_1$ ... $406_p$ and the storage device $408_1$ ... $408_p$ including the physical namespace/partition $406_1$ ... $406_p$. In certain embodiments, indication may be made in the assigned host 404 field or other part of the definition $400_i$ to allow any host, multiple hosts or no host to use the VNSID to access a physical namespace.

Figure 5:
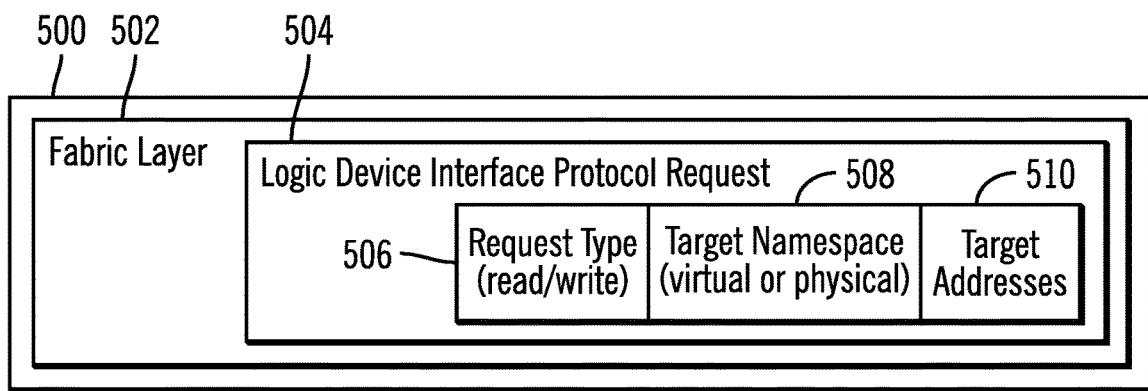
FIG. 5 illustrates an embodiment of a fabric packet.

FIG. 5 illustrates an embodiment of a fabric packet 500 for transmission across the network 108 having a fabric layer 502, including fabric information such as a header, error correction codes, source and destination addresses, and other information required for transmission across the network 108, and an encapsulated logic device interface protocol request 504, including a request type command 506, e.g., read or write; a target namespace 508, which may indicate a virtual namespace ID (VNSID) or physical namespace ID (NSID) to which the request 506 is directed; and specific target addresses 510 subject to the read/write request, which may comprise one or more logical block addresses which are subject to the requested read/write operation. The logic device interface protocol request 504 may include additional fields and information to process the request.

The virtual device layer 132 may configure the virtual subsystems 200, virtual controllers 300, and virtual namespaces 400 in the target memory 136 to represent to the attached host nodes $102_1$ ... $102_n$.

Figure 6:
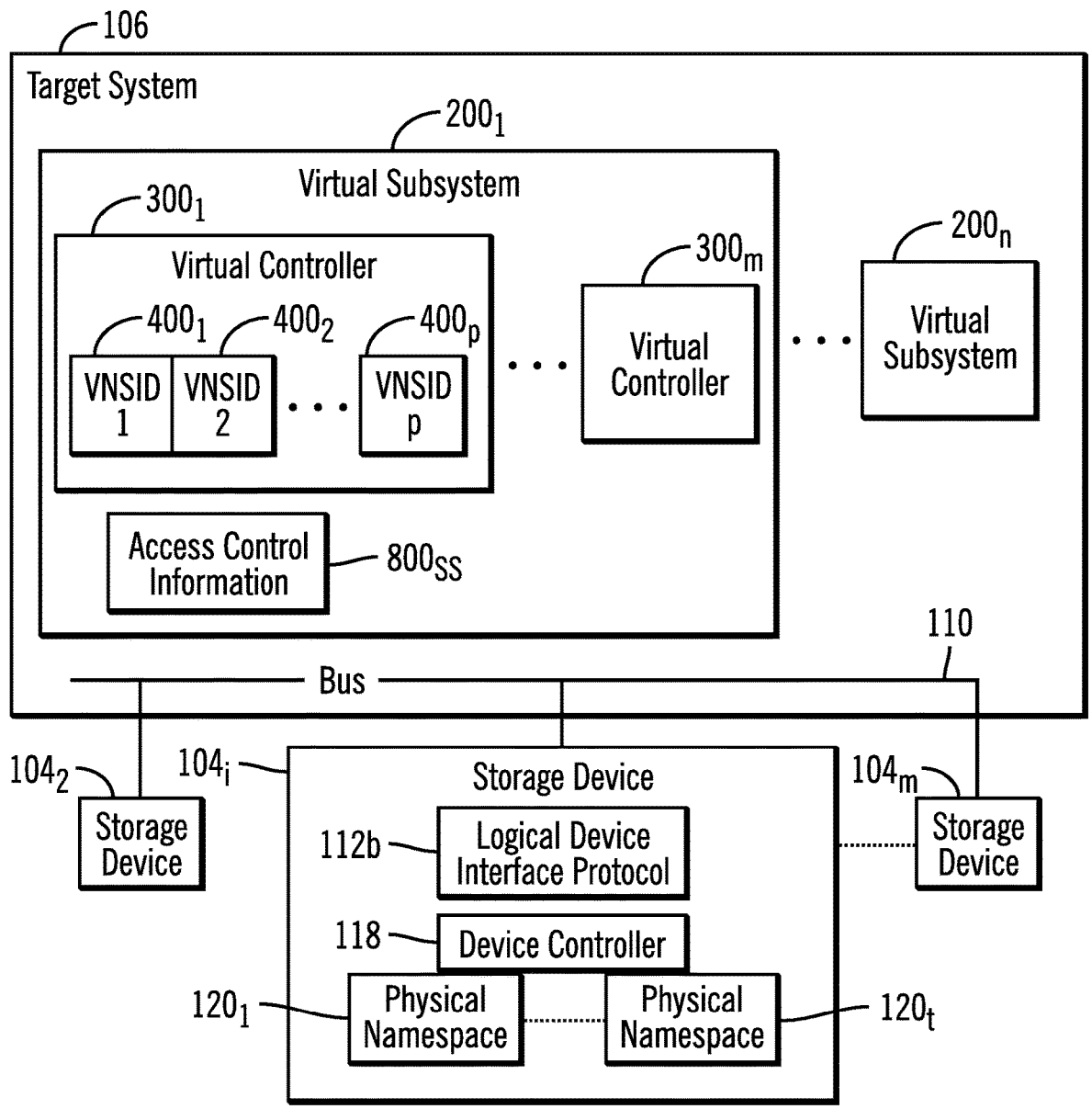
FIG. 6 illustrates an embodiment of virtual subsystem configurations.

FIG. 6 illustrates an embodiment of a representation of a configuration of virtual subsystems $200_1$ ... $200_n$ in the target system 106, where each virtual subsystem $200_1$ ... $200_n$ may include, as shown with respect to virtual subsystem $200_1$, one or more virtual controllers $300_1$ ... $300_m$. Each virtual controller $300_1$ ... $300_m$, as shown with respect to virtual controller $300_1$, can include one or more assigned virtual namespace identifiers (VNSID) $400_1$ ... $400_p$. Each virtual namespace identifier $400_1$ ... $400_p$, maps to one or more physical namespaces $120_1$ ... $120_t$ in the storage devices $104_1$ ... $104_m$, including a partition (range of addresses in the namespace) or the entire namespace. Each of the host nodes $102_1$ ... $102_n$ are assigned to one or more virtual subsystems $200_1$ ... $200_n$, and further to one or more virtual namespace IDs $400_1$ ... $400_p$ in the virtual controllers $300_1$ ... $300_m$ of the virtual subsystems $200_1$ ... $200_n$ to which the host node $102_i$ is assigned. The host nodes $102_1$ ... $102_n$ may access the physical namespace $120_1$ ... $120_t$ partitions that map to the virtual namespace IDs $400_1$ ... $400_p$ assigned to the hosts, where the host nodes $102_1$ ... $102_n$ access the virtual namespace through the virtual controller $300_i$ to which the VNSID is assigned and virtual subsystem $200_i$ to which the host node is assigned. The virtual subsystems $200_i$ may include access control information 800SS which indicates subsets of hosts allowed to access subsets of virtual controllers $300_1$ ... $300_m$ and namespaces (virtual or physical).

Different configurations of the virtual subsystems $200_1$ shown in FIG. 6 may be provided. For instance, the VNSIDs $400_1$ and $400_2$ in the virtual controller $300_i$ may map to different partitions of a same physical namespace $120_1$ in storage device $104_1$, and/or one VNSID $400_3$ in a virtual controller $300_2$ may map to different physical namespaces $120_2$ and $120_3$ in storage device $104_2$. In this way, a write to the VNSID $400_3$ in the second virtual controller $300_2$ writes to two separate physical namespaces $120_2$, $120_3$.

Additional configurations are possible. For instance, the same defined virtual namespace identifier that maps to one physical namespace may be included in two separate virtual controllers to allow for the sharing of a virtual namespace and the mapped physical namespace. Further, one virtual namespace can map to different physical namespaces or different partitions within a namespace in the same or different storage devices. A virtual namespace mapping to a physical namespace/partition may be included in multiple virtual controllers $300_i$ of one virtual subsystem to allow sharing of the virtual namespace by multiple hosts.

The host nodes $102_1$ ... $102_n$ may address a virtual namespace, by including the virtual subsystem (VSS) name, the virtual controller (VC), and the virtual namespace identifier (VNSID) in a combined address, such as VSSname.VCname.VNSID. In this way, virtual namespace IDs in different virtual controllers may have the same number identifier but point to different physical namespaces/partitions. Alternatively, the same virtual namespace IDs in different virtual controllers may point to the same shared physical namespace/partition.

FIG. 6 shows implementations of virtual subsystems and controllers. In further embodiments, some or all of the subsystems and controllers may be implemented in physical hardware components and not virtualized. In such physical implementations, the controllers may be assigned physical namespaces $120_1$ ... $120_t$ may address a namespace using the physical namespace $120_1$ ... $120_t$ addresses.

FIG. 7 illustrates an embodiment of the distributed discovery services 700 as including discovery service 702 comprising program code to perform discovery operations, access control list $800_D$ having information on subsets of hosts that can access different subsets of storage resources or namespaces (virtual or physical) at the controllers; a discovery database 900 having information on discovered target systems, including their subsystems, controllers, and namespace; and a discovery information page 1000 generated by the discovery service 702 to return to the host nodes $102_1$ ... $102_n$ to provide information on the target systems $106_1$ ... $106_m$ and namespaces for the requesting host node to use connect to the target systems $106_1$ ... $106_m$. The access control list $800_D$ may be configured by a system administrator that provisions the storage resources and physical and virtual namespaces to host systems to use. A remote service 704 comprises a module and services to allow an administrator to login remotely to the distributed discovery service 702 for configuration, diagnosis, and other operations, such as configuring the access control list $800_D$. The remote login may be from over the network 108.

FIG. 8 illustrates an instance of an entry $800_i$ in the access control list 800 maintained at the distributed discovery services 700, e.g., $800_D$, or in a subsystem $200_1$ ... $200_n$, e.g., $800_{SS}$, as including a host identifier 802 of one or more host nodes $102_1$ ... $102_n$, a controller ID 804 and storage resources 806, such as physical or virtual namespaces in the controller 804 that the one or more hosts 802 may access. For instance, the controller 804 may comprise an NVMe controller and the storage resources 806 may comprise the physical/virtual namespaces managed by the identified NVMe controller 804 and that are encapsulated within NVMe subsystems found on storage targets in the network 108. The access control list 800 may alternatively identify a class of hosts and storage resources of hosts that may access storage resources. The access control list $800_D$ at the distributed discovery services 700 may maintain access control information for all connected hosts across all subsystems, whereas the access control list $800ss$ at a subsystem may only identify hosts that may access physical namespaces in that particular subsystem.

FIG. 9 illustrates an embodiment of a discovery database entry $900_i$ including a target system identifier (ID) 902 of a discovered target system $106_i$, a subsystem 904, controller 906 and physical or virtual namespaces 908 in the discovered target system 902, and connection information 910 required to communicate with the target system 902 and subsystem 904 over the network 108. A database entry $900_i$ may further include information on how a virtual namespace (e.g., VNSIDs $400_1$, $400_2$ . . . $400_p$) maps to physical namespaces $120_1$ . . . $120_t$, which may be used by an administrator to configure the access control list $800_D$.

FIG. 10 illustrates an embodiment of a discovery page entry $1000_i$ of an instance of storage resources for which the discovery information page 1000 is generated, and includes a target system ID 1002, subsystem 1004, controller 1006 and allowed namespaces 1008 (virtual or physical) the host can access through the target system 1002, subsystem 1004, and controller 1006. The discovery page entry $1000_i$ further provides information needed to connect to the target system 1002 and subsystem 1004, such as a port, network address, etc. The host nodes $102_1$ . . . $102_n$ upon receiving a discovery information page 1000 may then access the namespaces 1008 in a target system/subsystem/controller indicated in the entries $1000_i$ in the discovery information page 1000.

Figure 11:
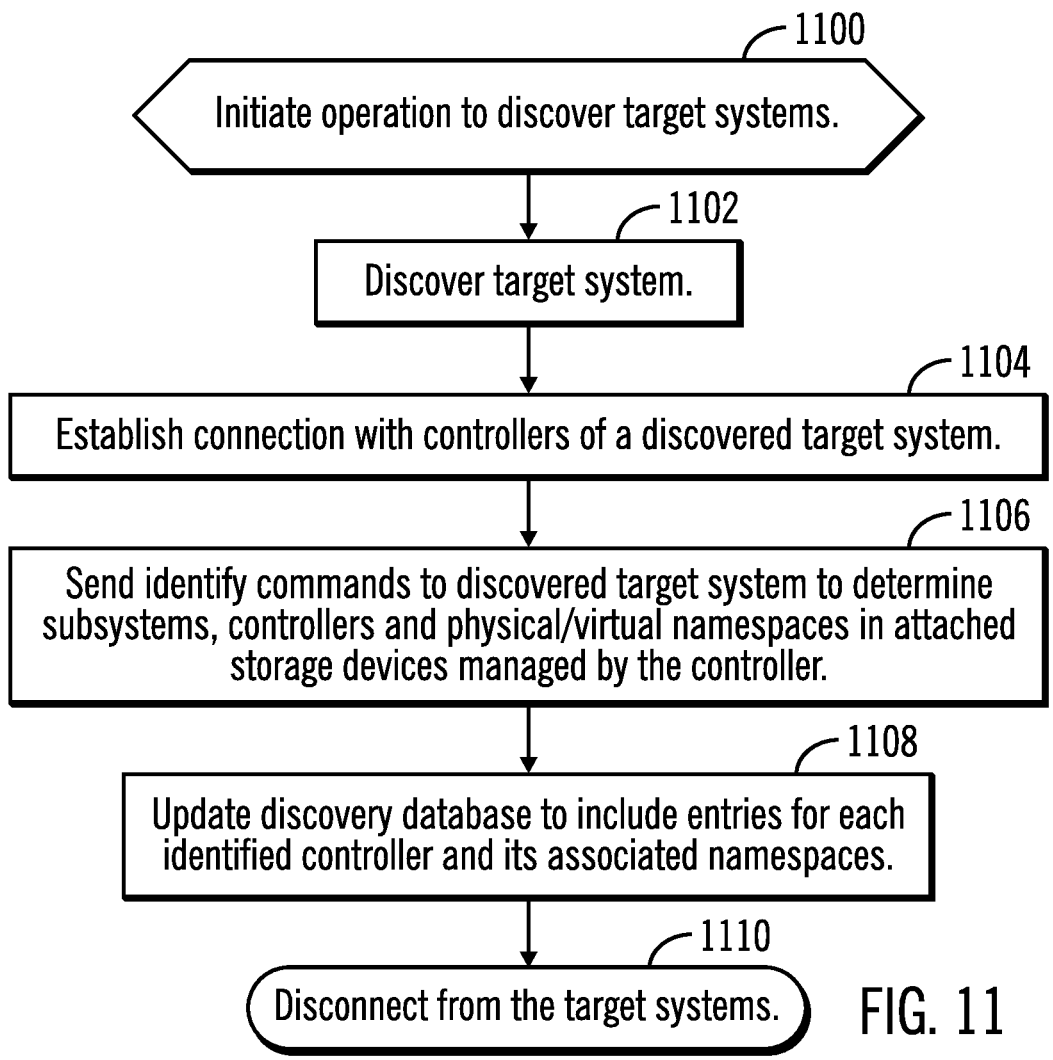
FIG. 11 illustrates an embodiment of operations to discovery target systems.

FIG. 11 illustrates an embodiment of operations performed by the discovery service 702 to discover target systems $106_1$ . . . $106_m$ and include information on discovered target systems $106_1$ . . . $106_m$ in the discovery database 900. At block 1100, the discovery service 702 initiates discovery operations and discovers (at block 1102) target systems $106_1$ . . . $106_m$. Target systems $106_1$ . . . $106_m$ may be discovered in response to notification from a target system $106_i$ when it becomes available in the network 108 or by the discovery service 702 broadcasting a discovery request in the network 108 to request target systems $106_1$ . . . $106_m$ to respond. The discovery service 702 may establish (at block 1104) a connection with the controllers $300_1$ . . . $300_t$ (virtual and physical) in a discovered target system $106_i$. In NVMe implementations, the discovery service 702 may connect to the controllers $300_1$ . . . $300_t$ administrative queue using Fabric layer protocols 114b, 114c. The discovery service 702 may then send (at block 1106) identify commands to the discovered target system $106_i$ to determine information on subsystems $200_i$, controllers $300_i$ and namespaces (VNSID $400_1$, $400_2$ . . . $400_p$ or physical $120_1$ . . . $120t$) in attached storage devices $104_i$ managed by the controller. The discovery service 702 updates (at block 1108) the discovery database 900 to include entries $900_i$ for each identified controller and its associated namespaces (virtual or physical). The discovery service 702 may disconnect (at block 1110) from the target system $106_i$ after gathering the information to update the discovery database 900.

Figure 12:
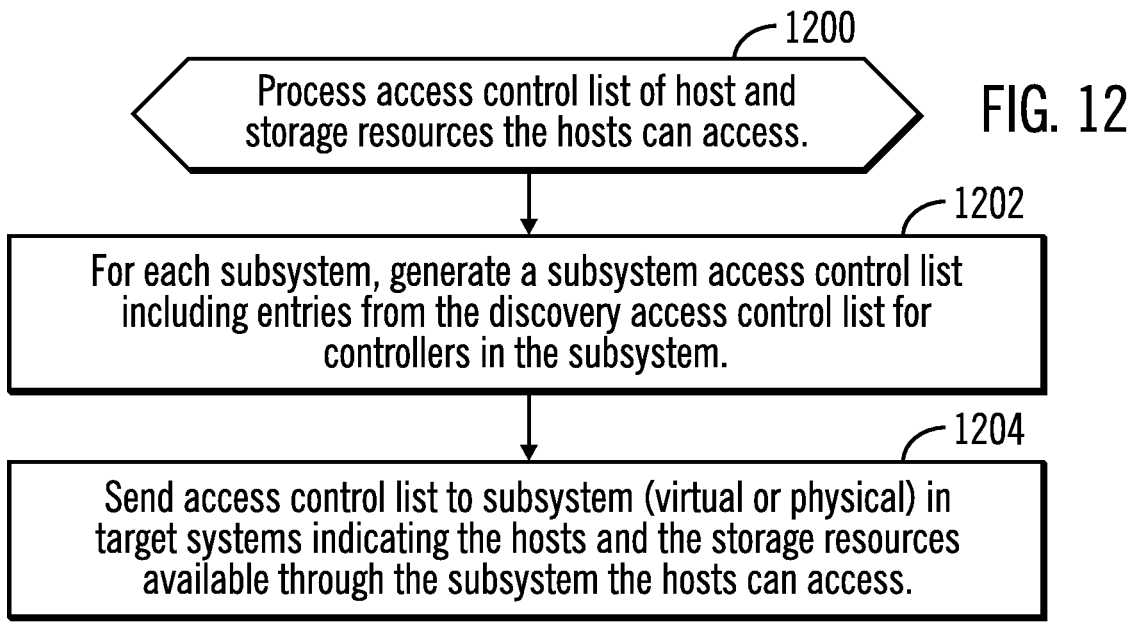
FIG. 12 illustrates an embodiment of operations to process an access control list.

FIG. 12 illustrates an embodiment of operations performed by the discovery service 702 to manage the access control list $800_D$ at the distributed discovery services 700. Upon processing (at block 1200) the access control list $800_D$ of host and storage resources the hosts can access, the discovery service 702 generates (at 1202), for each subsystem $200_i$ indicated in the discovery database 900, a subsystem access control list $800_{SS}$ including entries $800_i$ from the discovery access control list $800_D$ for controllers 804 in the subsystem $200_i$. The access control list $800_{SS}$ is sent (at block 1204) to the subsystem $200_i$ (virtual or physical) in the target system $106_i$ indicating the one or more hosts 802 and the storage resources 806 available through the subsystem the hosts 802 can access.

Figure 13:
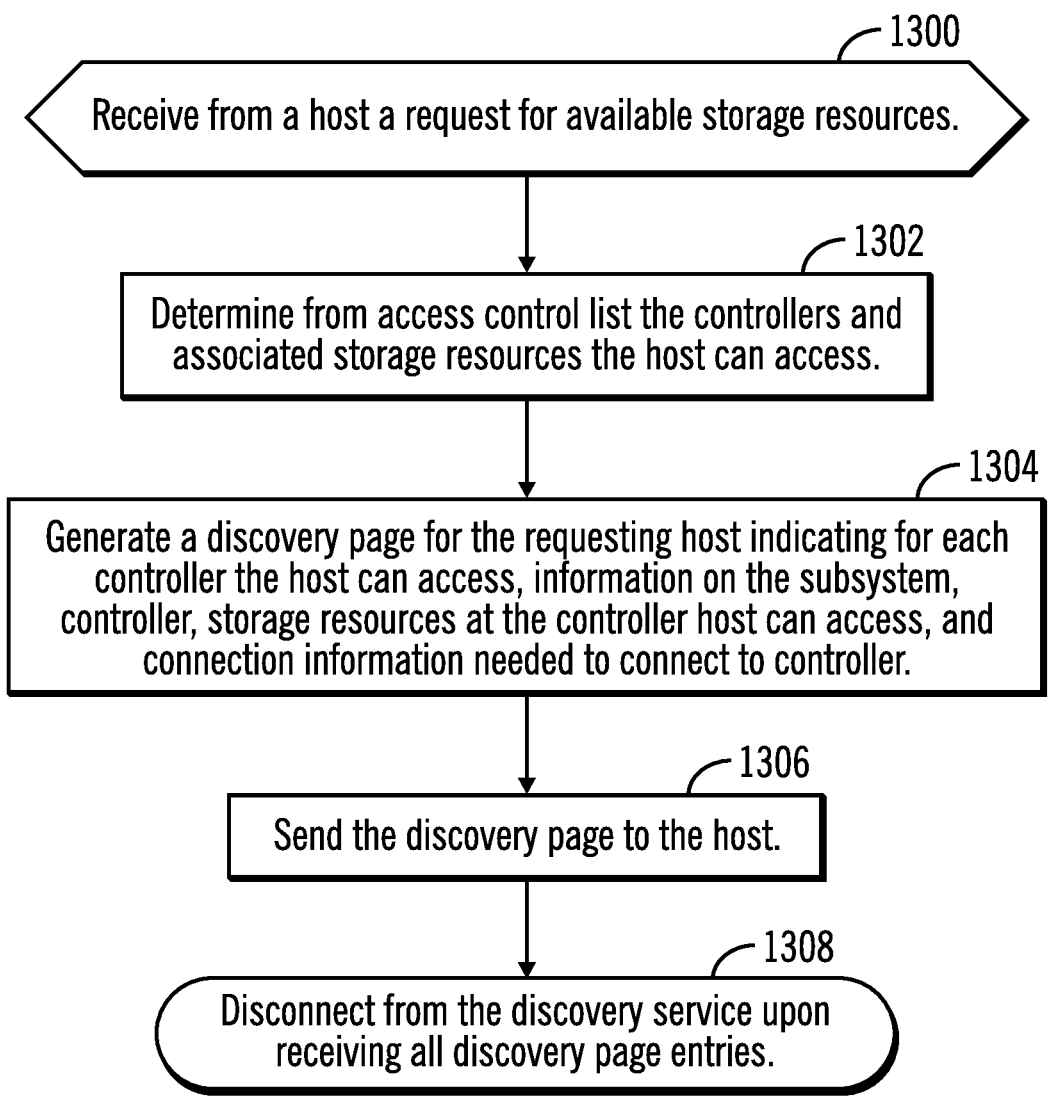
FIG. 13 illustrates an embodiment of operations to process a host request for available storage resources.

FIG. 13 illustrates an embodiment of operations performed by the discovery service 702 to process a request from a host node $102_i$ for information on available storage resources, e.g., virtual or physical namespaces. Upon receiving (at block 1300) a request from a connected host node $102_i$ for available storage resources, such as namespaces, the discovery service 702 determines (at block 1302) from the access control list $800_D$ the controllers 804 and storage resources 806 the requesting host $102_i$ can access, indicated in entries $800_i$ indicating the requesting host in the host field 802 (FIG. 8). A discovery information page 1000 is generated (at block 1304) for the requesting host $102_i$ indicating for each controller 906 the host can access, as indicated in access control list entries $800_i$ for the host, information on the subsystem $200_i$, controller 804, and storage resources 806 at the controller 804 the host $102_i$ can access, and connection information 910 needed to connect to controller, which is then included in corresponding fields 1002, 1004, 1006, 1008, and 1010 in a discovery page entry $1000_i$ in the discovery page 1000 being generated. The generated discovery page 1000 is sent (at block 1306) to the requesting host node $102_i$. The host $102_i$ may disconnect (at block 1308) from the discovery service 700 upon receiving all discovery page entries $1000_i$ in one or more discovery information pages 1000.

Figure 14:
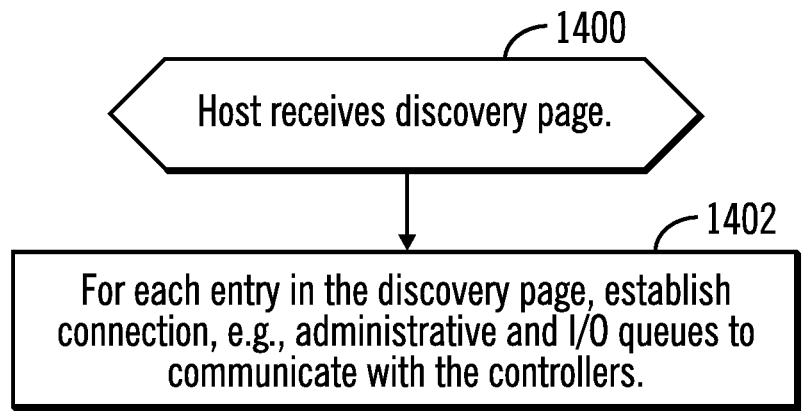
FIG. 14 illustrates an embodiment for a host to process a discovery page.

FIG. 14 illustrates an embodiment of operations performed by a host node 102i to process a received discovery page 1000 from the distributed discovery service 700. Upon receiving the discovery page 1000, for each entry 1000i in the discovery page 1000, the host node 102i establishes (at block 1402) a connection with the controllers indicated in the discovery page 1000 using the connection information 1010 in the discovery page entry 1000i. In NVMe embodiments, the host may use a connect command to create an admin queue to provide an association between the host and controller to establish the connection. Once the connection is established, the host node 102i may send Input/Output (I/O) requests to the controller to access the namespaces 1008 assigned in the discovery page 1000i to the controller 1006. In NVMe embodiments, the host node 102i may further send administrative commands to establish the connection. In this way, the host node 102i directly connects to the target system and storage resources upon receiving the discovery page 1000 independent of the distributed discovery service 700.

Figure 15:
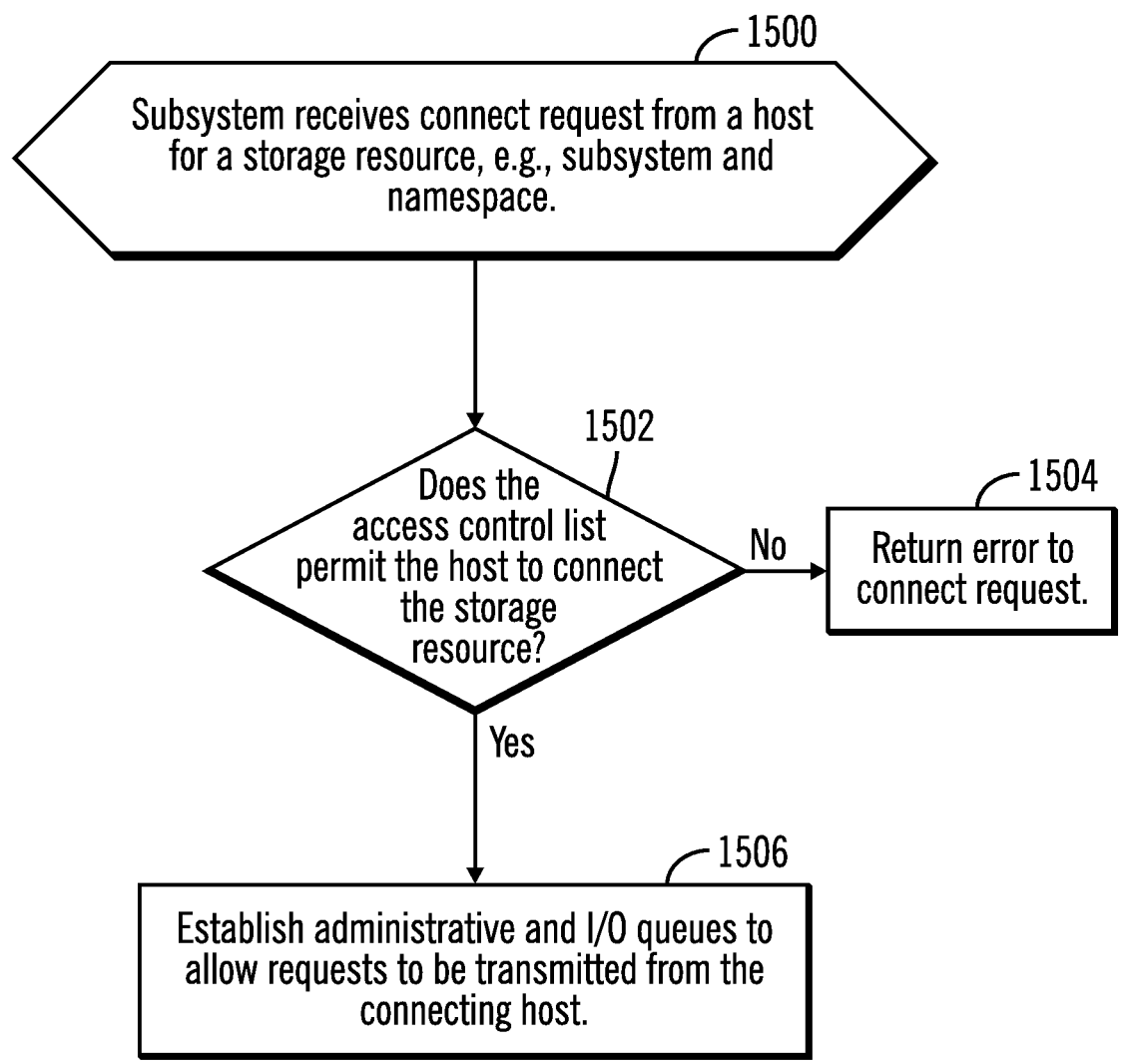
FIG. 15 illustrates an embodiment of operations of a subsystem to use an access control list to regulate host access to storage resources.

FIG. 15 illustrates an embodiment of operations performed by the subsystem $200_i$ to establish a connection with a host node $102_i$ to access a namespace or storage resource. Upon receiving (at block 1500) the connect request for a controller and namespace, the subsystem 200 determines (at block 1502) whether the access control list $800_{SS}$ includes an entry $800_i$ indicating that the requesting host is permitted to access the requested storage resource or namespace (virtual or physical). If (at block 1502) the subsystem access control list $800_{SS}$ does not indicate the requesting host $102_i$ can access the requested resource, e.g., namespace, then an error is returned (at block 1504) to the connect request that the connection is denied. If (at block 1502) the access control list $800_{SS}$ indicates the requesting host can access the specified storage resource, then the subsystem $200_i$ allows (at block 1506) the connect request to complete, and establishes any administrative I/O queues needed to communicate with the requested storage resource, e.g., physical or virtual namespace. In this way, FIG. 15 illustrates an embodiment for a subsystem $200_i$ to address the situation where a requesting host $102_i$ attempts to connect to a subsystem $200_i$ that the host has not been provisioned to access.

If the configuration of storage resources, such as subsystems, controllers, and virtual and physical namespaces fails, the target system $106_i$ may disconnect form the host node $102_j$ and may provide a reason code for the disconnection to the host node $102_j$. The host node $102_j$ may then reconnect to the target $106_i$ from which it disconnected or connect to the discovery service 700 to obtain updated information on the target $106_i$ and new storage resource configuration information in an update discovery page 1000.

With the described embodiments, a distributed discovery service interfaces between target systems and hosts to provide discovery services to the host for storage resources, such as virtual and physical namespaces. The distributed discovery service may inform target systems having the storage resources to access the hosts that are allowed to access advertised storage resources. In further embodiments, the target systems may be configured to limit access by maintaining a storage subsystem access control list to verify the host is provisioned the namespaces to which access is directed. Further, the hosts establish connections to the distributed discovery service based on fabric configuration and target clustering to discover allocated storage resources.

The described operations of the processing components, such as components 112a, 112b, 112c, 112d, 114a, 114b, 114c, 114d, 132, 138, 700, 702 and other components, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 16:
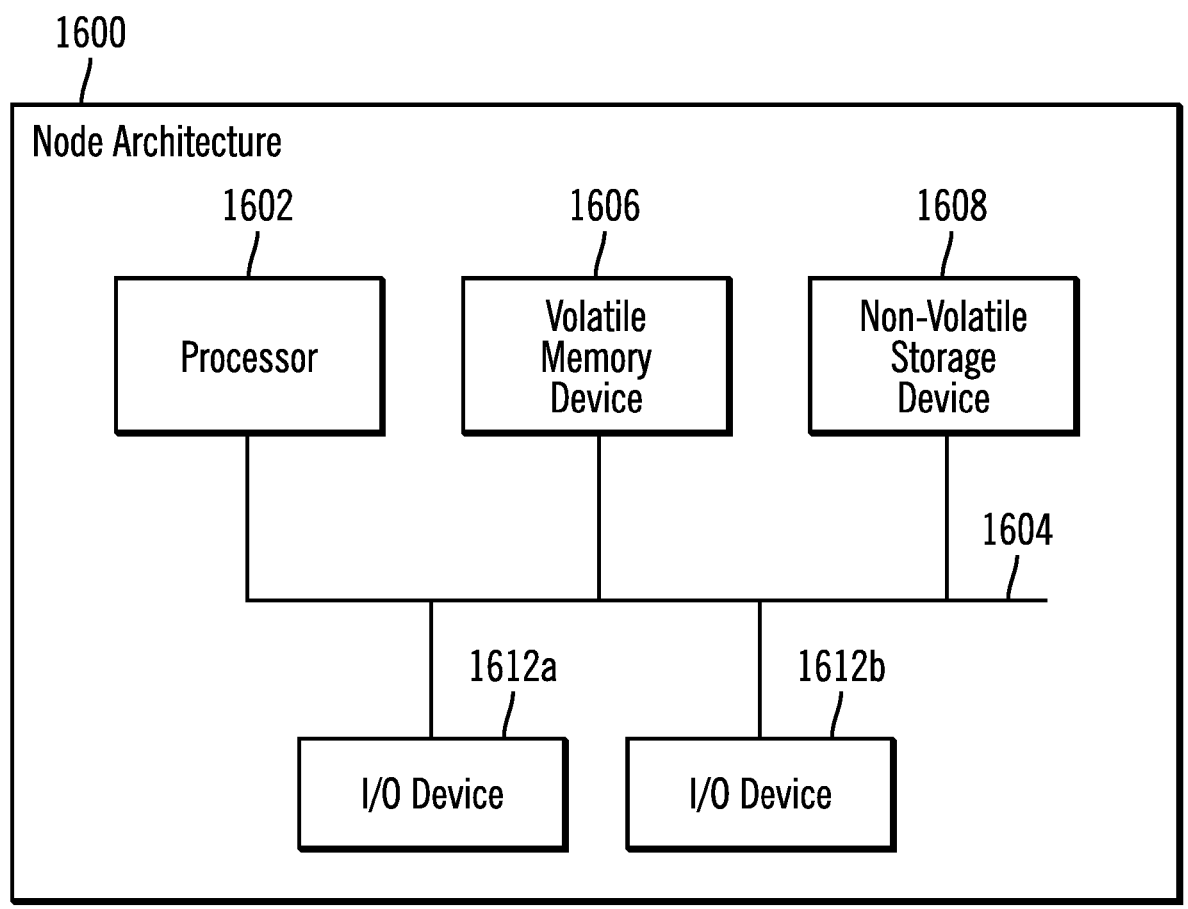
FIG. 16 illustrates an embodiment of a computer node architecture in which components may be implemented

FIG. 16 illustrates an embodiment of a computer node architecture 1600, such as the components included in the host nodes $102_1$, $102_2$ . . . $102_n$, the target systems $106_1$ . . . $106_m$, and the discovery system 150, including a processor 1602 that communicates over a bus 1604 with a volatile memory device 1606 in which programs, operands and parameters being executed are cached, and a non-volatile storage device 1604, such as target system memory 136. The bus 1604 may comprise multiple buses. Further, the bus 1604 may comprise a multi-agent bus or not be a multi-agent bus, and instead provide point-to-point connections according to PCIe architecture. The processor 1602 may also communicate with Input/output (I/O) devices 1612a, 1612b, which may comprise input devices, display devices, graphics cards, ports, network interfaces, etc. For the host nodes $102_1$, $102_2$ . . . $102_n$ and the discovery system 150, the virtual subsystems may also appear on the bus 1004 as bus components.

In certain embodiments, the computer node architecture 1600 may comprise a personal computer, server, mobile device or embedded compute device. In a silicon-on-chip (SOC) implementation, the architecture 1600 may be implemented in an integrated circuit die. In certain implementations, the architecture 1600 may not include a PCIe bus to connect to NVMe storage devices, and instead include a network adaptor to connect to a fabric or network and send communications using the NVMe interface to communicate with the target systems $106_1$ . . . $106_m$ to access underlying storage devices $104_1$ . . . $104_m$.

The reference characters used herein, such as i, j, m, n, p, and t are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is a computer program product for dynamically providing discovery services for host nodes of target systems and storage resources including a computer readable storage media in communication with the host nodes and the target systems over a network, wherein the computer readable storage media includes code executed by a processor to implement a discovery service that is executed to: discover storage resources available at target systems over the network; provide an access control list indicating subsets of the host nodes that can access the storage resources at the target systems; receive a query from a requesting host node comprising one of the host nodes for the storage resources the host node is permitted to access according to the access control list; and return host discovery information to the requesting host node indicating the storage resources the requesting host node is provisioned to access from the target systems as indicated in the access control list, wherein the requesting host node establishes a connection with the target systems to access the storage resources the requesting host node is provisioned to access indicated in the access control list.

In Example 2, the subject matter of examples 1 and 3-9 can optionally include that the access control list associates subsets of at least one host node with subsets of at least one of the storage resources the subset of the subset of at least one host node can access.

In Example 3, the subject matter of examples 1, 2 and 4-9 can optionally include that the discover the storage resources available at the target systems comprises: send queries to the target systems to obtain information on controllers configured in the target systems and the storage resources managed by the controllers; and update a discovery database having information on the storage resources and their controllers in the target systems with information on the controllers and the storage resources returned in response to the queries and with connection information to access the controllers in the target systems to access the storage resources, wherein the controllers manage access to the storage resources, and wherein the host discovery information returned to the requesting host node includes information on the controllers and storage resources the requesting host node is provisioned to access indicated in the discovery database.

In Example 4, the subject matter of examples 1-3 and 5-9 can optionally include that the discovery service is further executed to: query the target systems to request information on updates to the controllers and storage resources at the target system; and update the discovery database with information on updates to the controllers and storage resources at the target systems in response to the query of the target systems, wherein the host nodes connect to the discovery service to request updated information on the controllers and storage resources in the discovery database the host nodes are provisioned to access according to the access control list.

In Example 5, the subject matter of examples 1-4 and 6-9 can optionally include that the discovery database includes connection information the host node uses to connect to the target systems and storage resources, including fabric type of a fabric type used to connect to the target system and ports at the target system.

In Example 6, the subject matter of examples 1-5 and 7-9 can optionally include that the target systems include subsystems, wherein each subsystem includes at least one controller, and wherein each controller is assigned namespaces of storage resources in storage devices, wherein the send queries comprises: send a query to each subsystem in one of the target systems for controller information on controllers of the subsystem; and send a query to each of the controllers indicated in the controller information from the subsystems in response to the query for physical name space information of physical name spaces of the storage resources maintained by the controller to which the query is sent.

In Example 7, the subject matter of examples 1-6 and 8-9 can optionally include that least one of the target systems include virtual subsystems and virtual controllers, wherein the controllers maintain virtual namespaces map to different ranges of addresses within one physical namespace in one of the storage resources.

In Example 8, the subject matter of examples 1-7 and 9 can optionally include that the discovery service is implemented in a discovery subsystem, and wherein the target systems, the host nodes, and the discovery subsystem implement a logical device interface protocol to establish connections and communicate read and write requests and implement a fabric protocol to communicate over a network.

In Example 9, the subject matter of examples 1-8 can optionally include that the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

Example 10 is a system for dynamically providing discovery services for host nodes of target systems and storage resources, comprising: a processor; and a computer readable storage media including computer program code executed by the processor to: discover storage resources available at target systems over the network; provide an access control list indicating subsets of the host nodes that can access the storage resources at the target systems; receive a query from a requesting host node comprising one of the host nodes for storage resources the host node is permitted to access according to the access control list; and return host discovery information to the requesting host node indicating the storage resources the requesting host node is provisioned to access from the target systems as indicated in the access control list, wherein the requesting host node establishes a connection with the target systems to access the storage resources the requesting host node is provisioned to access indicated in the access control list.

In Example 11, the subject matter of examples 10 and 12-17 can optionally include that the access control list associates subsets of at least one host node with subsets of at least one of the storage resources the subset of the subset of at least one host node can access.

In Example 12, the subject matter of examples 10, 11 and 13-17 can optionally include that the discover the storage resources available at the target systems comprises: send queries to the target systems to obtain information on controllers configured in the target systems and storage resources managed by the controllers; and update a discovery database having information on the storage resources and their controllers in the target systems with information on the controllers and the storage resources returned in response to the queries and with connection information to access the controllers in the target systems to access the storage resources, wherein the controllers manage access to the storage resources, and wherein the host discovery information returned to the requesting host node includes information on the controllers and storage resources the requesting host node is provisioned to access indicated in the discovery database.

In Example 13, the subject matter of examples 10-12 and 14-17 can optionally include that the discovery service is further executed to: query the target systems to request information on updates to the controllers and storage resources at the target system; and update the discovery database with information on updates to the controllers and storage resources at the target systems in response to the query of the target systems, wherein the host nodes connect to the discovery service to request updated information on the controllers and storage resources in the discovery database the host nodes are provisioned to access according to the access control list.

In Example 14, the subject matter of examples 10-13 and 15-17 can optionally include that the discovery database includes connection information the host node uses to connect to the target systems and storage resources, including fabric type of a fabric type used to connect to the target system and ports at the target system.

In Example 15, the subject matter of examples 10-14 and 16-17 can optionally include that the target systems include subsystems, wherein each subsystem includes at least one controller, and wherein each controller is assigned namespaces of storage resources in storage devices, wherein the send queries comprises: send a query to each subsystem in one of the target systems for controller information on controllers of the subsystem; and send a query to each of the controllers indicated in the controller information from the subsystems in response to the query for physical name space information of physical name spaces of the storage resources maintained by the controller to which the query is sent.

In Example 16, the subject matter of examples 10-15 and 17 can optionally include that the discovery service is implemented in a discovery subsystem, and wherein the target systems, the host nodes, and the discovery subsystem implement a logical device interface protocol to establish connections and communicate read and write requests and implement a fabric protocol to communicate over a network.

In Example 17, the subject matter of examples 10-16 can optionally include that the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

Example 18 is a method for dynamically providing discovery services for host nodes of target systems and storage resources, comprising: discovering the storage resources available at the target systems over a network; providing an access control list indicating subsets of the host nodes that can access the storage resources at the target systems; receiving a query from a requesting host node comprising one of the host nodes for the storage resources the host node is permitted to access according to the access control list; and returning host discovery information to the requesting host node indicating the storage resources the requesting host node is provisioned to access from the target systems as indicated in the access control list, wherein the requesting host node establishes a connection with the target systems to access the storage resources the requesting host node is provisioned to access indicated in the access control list.

In Example 19, the subject matter of examples 18 and 20-25 can optionally include that the access control list associates subsets of at least one host node with subsets of at least one of the storage resources the subset of the subset of at least one host node can access.

In Example 20, the subject matter of examples 18, 19 and 21-25 can optionally include that the discovering the storage resources available at the target systems comprises: sending queries to the target systems to obtain information on controllers configured in the target systems and the storage resources managed by the controllers; and updating a discovery database having information on the storage resources and their controllers in the target systems with information on the controllers and storage resources returned in response to the queries and with connection information to access the controllers in the target systems to access the storage resources, wherein the controllers manage access to the storage resources, and wherein the host discovery information returned to the requesting host node includes information on the controllers and storage resources the requesting host node is provisioned to access indicated in the discovery database.

In Example 21, the subject matter of examples 18-20 and 22-25 can optionally include querying the target systems to request information on updates to the controllers and storage resources at the target system; and updating the discovery database with information on updates to the controllers and storage resources at the target systems in response to the query of the target systems, wherein the host nodes connect to the discovery service to request updated information on the controllers and storage resources in the discovery database the host nodes are provisioned to access according to the access control list.

In Example 22, the subject matter of examples 18-21 and 23-25 can optionally include that the discovery database includes connection information the host node uses to connect to the target systems and storage resources, including fabric type of a fabric type used to connect to the target system and ports at the target system.

In Example 23, the subject matter of examples 18-22 and 24-25 can optionally include that the target systems include subsystems, wherein each subsystem includes at least one controller, and wherein each controller is assigned namespaces of storage resources in storage devices, wherein the sending queries comprises: sending a query to each subsystem in one of the target systems for controller information on controllers of the subsystem; and sending a query to each of the controllers indicated in the controller information from the subsystems in response to the query for physical name space information of physical name spaces of the storage resources maintained by the controller to which the query is sent.

In Example 24, the subject matter of examples 18-23 and 25 can optionally include that the discovery service is implemented in a discovery subsystem, and wherein the target systems, the host nodes, and the discovery subsystem implement a logical device interface protocol to establish connections and communicate read and write requests and implement a fabric protocol to communicate over a network.

In Example 25, the subject matter of examples 18-24 can optionally include that the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

In Example 26, the subject matter of claim 14, can optionally include at least any one of:

(1) wherein the access control list associates subsets of at least one host node with subsets of at least one of the storage resources the subset of the subset of at least one host node can access; and/or.

(2) wherein the discover the storage resources available at the target systems comprises: send queries to the target systems to obtain information on controllers configured in the target systems and the storage resources managed by the controllers; and update a discovery database having information on the storage resources and their controllers in the target systems with information on the controllers and the storage resources returned in response to the queries and with connection information to access the controllers in the target systems to access the storage resources, wherein the controllers manage access to the storage resources, and wherein the host discovery information returned to the requesting host node includes information on the controllers and storage resources the requesting host node is provisioned to access indicated in the discovery database; and/or (3) wherein the discovery service is further executed to: query the target systems to request information on updates to the controllers and storage resources at the target system; and update the discovery database with information on updates to the controllers and storage resources at the target systems in response to the query of the target systems, wherein the host nodes connect to the discovery service to request updated information on the controllers and storage resources in the discovery database the host nodes are provisioned to access according to the access control list; and/or (4) wherein the discovery database includes connection information the host node uses to connect to the target systems and storage resources, including fabric type of a fabric type used to connect to the target system and ports at the target system; and/or (5) wherein the target systems include subsystems, wherein each subsystem includes at least one controller, and wherein each controller is assigned namespaces of storage resources in storage devices, wherein the send queries comprises: send a query to each subsystem in one of the target systems for controller information on controllers of the subsystem; and send a query to each of the controllers indicated in the controller information from the subsystems in response to the query for physical name space information of physical name spaces of the storage resources maintained by the controller to which the query is sent; and/or (6) wherein least one of the target systems include virtual subsystems and virtual controllers, wherein the controllers maintain virtual namespaces map to different ranges of addresses within one physical namespace in one of the storage resources; and/or (7) wherein the discovery service is implemented in a discovery subsystem, and wherein the target systems, the host nodes, and the discovery subsystem implement a logical device interface protocol to establish connections and communicate read and write requests and implement a fabric protocol to communicate over a network; and/or (8) wherein the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

Example 27 is an apparatus for dynamically providing discovery services for host nodes of target systems and storage resources, comprising: means for discovering the storage resources available at the target systems over a network; means for providing an access control list indicating subsets of the host nodes that can access the storage resources at the target systems; means for receiving a query from a requesting host node comprising one of the host nodes for the storage resources the host node is permitted to access according to the access control list; and means for returning host discovery information to the requesting host node indicating the storage resources the requesting host node is provisioned to access from the target systems as indicated in the access control list, wherein the requesting host node establishes a connection with the target systems to access the storage resources the requesting host node is provisioned to access indicated in the access control list.

Example 28 is an apparatus comprising means to perform a method as claimed in any preceding claim.

Example 29 is a machine-readable storage including machine-readable instructions, when executed to implement a method or realize and apparatus as claimed in any preceding claim.

What is claimed:

1. A non-transitory computer-readable storage media comprising instructions stored thereon, that, if executed by at least one processor, cause the at least one processor to:

generate an access control list indicating any host node that can access storage resources of one or more target systems, wherein the access control list includes information on one or more hosts provisioned to access storage resources managed by target systems and at least one of the target systems includes one or more physical or virtual subsystems;

receive a request from a requesting host node for storage resources that the requesting host node is permitted to access;

provide host discovery information, based on the access control list, to the requesting host node indicating the storage resources, including one or more virtual subsystems, that the requesting host node is permitted to access; and provide connection information, based on the access control list, to the requesting host node to connect to the at least one of the target systems.

2. The computer-readable storage media of claim 1, wherein a virtual subsystem comprises a representation of one or more storage resources and physical namespaces and comprises a virtual controller identifier and virtualization namespace definitions.

3. The computer-readable storage media of claim 2, wherein the virtualization namespace definitions map to one or more physical namespaces.

4. The computer-readable storage media of claim 1, comprising instructions stored thereon, that, if executed by at least one processor, cause the at least one processor to:
provide the access control list to at least one of the target systems including one or more virtual subsystems, the access control list to identify any physical or virtual storage resource available for access by a host.

5. The computer-readable storage media of claim 1, comprising instructions stored thereon, that, if executed by at least one processor, cause the at least one processor to:
provide communications with a host node, the communications compatible with a Non-Volatile Memory Express (NVMe) protocol.

6. The computer-readable storage media of claim 1, comprising instructions stored thereon, that, if executed by at least one processor, cause the at least one processor to:
in response to a request from a host node, provide a connection with the host node to allow the host node to discover available storage resources and connection information associated with the available storage resources and
disconnect the connection with the host node.

7. The computer-readable storage media of claim 6, comprising instructions stored thereon, that, if executed by at least one processor, cause the at least one processor to:
initiate transmission of requests to the target systems to obtain information on controllers configured in the target systems and the storage resources managed by the controllers and
update a discovery database including information on the storage resources and their controllers in the target systems with any changes to the discovery database based on the obtained information.

8. The computer-readable storage media of claim 1, comprising instructions stored thereon, that, if executed by at least one processor, cause the at least one processor to:
provide a secure tunneling mode for secure communications with one or more host nodes.

9. A system in communication with host nodes and target systems over a network, the system comprising:
at least one fabric interface;
at least one memory; and
at least one processor communicatively coupled to the at least one memory and to the at least one fabric interface, wherein the at least one processor is to:
generate an access control list indicating any host node that can access storage resources of one or more target systems, wherein the access control list includes information on one more hosts provisioned to access storage resources managed by target systems and at least one of the target systems includes one or more physical or virtual subsystems;
receive a request from a requesting host node for storage resources that the requesting host node is permitted to access;
provide host discovery information, based on the access control list, to the requesting host node indicating the storage resources, including one or more virtual subsystems, that the requesting host node is permitted to access; and
provide connection information, based on the access control list, to the requesting host node to connect to the at least one of the target systems.

10. The system of claim 9, wherein a virtual subsystem comprises a representation of one or more storage resources and physical namespaces and comprises a virtual controller identifier and virtualization namespace definitions.

11. The system of claim 10, wherein the virtualization namespace definitions map to one or more physical namespaces.

12. The system of claim 9, wherein the at least one processor is to:
provide the access control list to at least one of the target systems including one or more virtual subsystems, the access control list to identify any physical or virtual storage resource available for access by a host.

13. The system of claim 9, wherein the at least one processor is to:
provide communications with a host node, the communications compatible with a Non-Volatile Memory Express (NVMe) protocol.

14. The system of claim 9, wherein the at least one processor is to:
in response to a request from a host node, provide a connection with the host node to allow the host node to discover available storage resources and connection information associated with the available storage resources and
disconnect the connection with the host node.

15. The system of claim 9, wherein the at least one processor is to:
initiate transmission of requests to the target systems to obtain information on controllers configured in the target systems and the storage resources managed by the controllers and
update a discovery database including information on the storage resources and their controllers in the target systems with any changes to the discovery database based on the obtained information.

16. The system of claim 9, wherein the at least one processor is to:
provide a secure tunneling mode for secure communications with one or more host nodes.

17. A method, comprising:
generating an access control list indicating any host node that can access storage resources of one or more target systems, wherein the access control list includes information on one more hosts provisioned to access storage resources managed by target systems and at least one of the target systems includes one or more physical or virtual subsystems;
receiving a request from a requesting host node for storage resources that the requesting host node is permitted to access;
providing host discovery information, based on the access control list, to the requesting host node indicating the storage resources, including one or more virtual subsystems, that the requesting host node is permitted to access; and
providing connection information, based on the access control list, to the requesting host node to connect to the at least one of the target systems.

18. The method of claim 17, wherein a virtual subsystem comprises a representation of one or more storage resources and physical namespaces and comprises a virtual controller identifier and virtualization namespace definitions.

19. The method of claim 18, wherein the virtualization namespace definitions map to one or more physical namespaces.

20. The method of claim 17, comprising:
providing the access control list to at least one of the target systems including one or more virtual subsystems, the access control list to identify any physical or virtual storage resource available for access by a host.

21. The method of claim 17, comprising:
providing communications with a host node, the communications compatible with a Non-Volatile Memory Express (NVMe) protocol.

22. The method of claim 17, comprising:
in response to a request from a host node, providing a connection with the host node to allow the host node to discover available storage resources and connection information associated with the available storage resources and
disconnecting the connection with the host node.

23. The method of claim 17, comprising:
initiating transmission of requests to the target systems to obtain information on controllers configured in the target systems and the storage resources managed by the controllers and
updating a discovery database including information on the storage resources and their controllers in the target systems with any changes to the discovery database based on the obtained information.

24. The method of claim 17, comprising:
providing a secure tunneling mode for secure communications with one or more host nodes.

25. A method, comprising:
receiving, at a target system and from a discovery system, a request to provide information on one or more storage subsystems configured in the target system, the one or more storage subsystems configured in the target system as physical or virtual subsystems;
providing, from the target system to the discovery system, information on one or more available storage subsystems;
receiving, at the target system and from the discovery system, an access control list identifying at least one storage subsystem and at least one host node that can access the at least one storage subsystem;
receiving, at the target system from a first host node, a request to access a storage subsystem; and
in response to verification of the first host node associated with the request based on the access control list indicating the first host node having permission, providing access to a physical or virtual storage subsystem.

26. The method of claim 25, wherein a storage subsystem comprises physical or virtual namespaces.

27. The method of claim 25, wherein a storage subsystem comprises physical or virtual controllers and a range of physical or virtual namespaces.

* * * * *